(12) United States Patent
Borntraeger et al.

(10) Patent No.: US 8,444,519 B2
(45) Date of Patent: *May 21, 2013

(54) HYBRID DRIVE TRAIN OF A MOTOR VEHICLE

(75) Inventors: Kai Borntraeger, Langenargen (DE); Rene Budach, Ravensburg (DE); Axel Michael Mueller, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 132 days.

This patent is subject to a terminal disclaimer.

(21) Appl. No.: 13/062,824

(22) PCT Filed: Sep. 7, 2009

(86) PCT No.: PCT/EP2009/061534
§ 371 (c)(1),
(2), (4) Date: May 25, 2011

(87) PCT Pub. No.: WO2010/029035
PCT Pub. Date: Mar. 18, 2010

(65) Prior Publication Data
US 2011/0263370 A1    Oct. 27, 2011

(30) Foreign Application Priority Data
Sep. 9, 2008   (DE) .................. 10 2008 041 887

(51) Int. Cl.
*F16H 3/72* (2006.01)
*F16H 37/06* (2006.01)

(52) U.S. Cl.
USPC .......................................................... 475/5

(58) Field of Classification Search
USPC ................ 475/1, 5, 198, 204, 205, 221, 269, 475/275, 286, 296; 903/910
See application file for complete search history.

(56) References Cited

U.S. PATENT DOCUMENTS

| | | |
|---|---|---|
| 5,285,111 A | 2/1994 | Sherman |
| 5,735,770 A | 4/1998 | Omote et al. |
| 5,771,478 A | 6/1998 | Tsukamoto et al. |
| 2,895,333 A | 4/1999 | Morisawa et al. |
| 6,354,974 B1 | 3/2002 | Kozarekar |
| 6,705,416 B1 | 3/2004 | Glonner et al. |

(Continued)

FOREIGN PATENT DOCUMENTS

| | | |
|---|---|---|
| CN | 101020411 A * | 8/2007 |
| DE | 195 03 500 A1 | 8/1996 |

(Continued)

*Primary Examiner* — Justin Holmes
(74) *Attorney, Agent, or Firm* — Davis & Bujold, PLLC

(57) ABSTRACT

A hybrid drive train of a motor vehicle which comprises a combustion engine, an electric machine which is operable as a motor and a generator and comprises a stator and a rotor, and a multi-stage planetary transmission with input and output shafts. The driveshaft of the combustion engine can be connected to the input shaft of the transmission, the electric machine is coaxially arranged about the input shaft, and the rotor of the electric machine is rigidly connected with the input shaft. To achieve a starting acceleration and climbing capacity on starting, corresponding to those provided by a drive train with an automatic transmission and a hydrodynamic torque converter or a manual gearshift transmission with a converter shifting clutch, the rotor of the electric machine can be connected with the transmission input shaft via an input transmission stage which is formed as a simple planetary gearset and has a high gear ratio.

16 Claims, 10 Drawing Sheets

U.S. PATENT DOCUMENTS

| | | | |
|---|---|---|---|
| 6,746,354 B1 | 6/2004 | Ziemer | |
| 6,805,648 B1 | 10/2004 | Ehrlinger | |
| 6,966,860 B2 | 11/2005 | Heitmann et al. | |
| 7,169,074 B2 * | 1/2007 | Raghavan et al. | 475/5 |
| 7,244,208 B2 | 7/2007 | Bauknecht et al. | |
| 7,273,435 B2 * | 9/2007 | Raghavan et al. | 475/151 |
| 7,416,501 B2 * | 8/2008 | Holmes et al. | 475/5 |
| 2006/0048516 A1 | 3/2006 | Tenbrock et al. | |
| 2011/0124455 A1 * | 5/2011 | Borntraeger et al. | 475/5 |

FOREIGN PATENT DOCUMENTS

| | | |
|---|---|---|
| DE | 199 17 665 A1 | 10/2000 |
| DE | 100 18 926 A1 | 11/2000 |
| DE | 199 23 316 A1 | 11/2000 |
| DE | 100 12 221 A1 | 10/2001 |
| DE | 199 34 696 A1 | 5/2004 |
| DE | 103 46 640 A1 | 5/2005 |
| EP | 0 769 404 A1 | 4/1997 |
| JP | 57-059124 U | 4/1982 |
| JP | 2003 019911 A | 1/2003 |
| WO | 03/016749 A1 | 2/2003 |
| WO | 2010/007125 A1 | 1/2010 |
| WO | 2010/007126 A1 | 1/2010 |

* cited by examiner

| SHIFT ELEMENT / GEAR | C1 | C2 | B1 | B2 | B3 | GEAR RATIO i |
|---|---|---|---|---|---|---|
| G1 | X |  |  |  | X | 3.364 |
| G2 | X |  |  | X |  | 1.909 |
| G3 | X |  | X |  |  | 1.421 |
| G4 | X | X |  |  |  | 1.000 |
| G5 |  | X | X |  |  | 0.720 |
| G6 |  | X |  | X |  | 0.615 |
| R |  |  | X |  | X | -4.235 |

Fig.2

| SHIFT ELEMENT / GEAR | K1 | K2 | C1 | C2 | B1 | B2 | B3 | GEAR RATIO i |
|---|---|---|---|---|---|---|---|---|
| G1L |  | X | X |  |  |  | X | 6.055 |
| G2L |  | X | X |  |  | X |  | 3.436 |
| G3L |  | X | X |  | X |  |  | 2.558 |
| G4L |  | X | X | X |  |  |  | 1.800 |
| G5L |  | X |  | X | X |  |  | 1.296 |
| G6L |  | X |  | X |  | X |  | 1.107 |
| RL |  | X |  |  | X |  | X | -7.623 |
| G1H | X |  | X |  |  |  | X | 3.364 / 6.055 |
| G2H | X |  | X |  |  | X |  | 1.909 / 3.436 |
| G3H | X |  | X |  | X |  |  | 1.421 / 2.558 |
| G4H | X |  | X | X |  |  |  | 1.000 / 1.800 |
| G5H | X |  |  | X | X |  |  | 0.720 / 1.296 |
| G6H | X |  |  | X |  | X |  | 0.615 / 1.107 |
| RH | X |  |  |  | X |  | X | -4.235 / -7.623 |

Fig.5

| SHIFT ELEMENT / GEAR | K1 | K2 | A | B | C | D | E | F | G | H | GEAR RATIO i |
|---|---|---|---|---|---|---|---|---|---|---|---|
| G1L |  | X | X |  |  |  | X |  | X |  | 26,96 |
| G2L |  | X |  | X |  |  | X |  | X |  | 20,95 |
| G3L |  | X | X |  |  | X |  |  | X |  | 16,26 |
| G4L |  | X |  | X |  | X |  |  | X |  | 12,64 |
| G5L |  | X | X |  | X |  |  |  | X |  | 9,98 |
| G6L |  | X |  | X | X |  |  |  | X |  | 7,76 |
| G7L |  | X | X |  |  |  | X |  |  | X | 5,91 |
| G8L |  | X |  | X |  |  | X |  |  | X | 4,59 |
| G9L |  | X | X |  |  | X |  |  |  | X | 3,56 |
| G10L |  | X |  | X |  | X |  |  |  | X | 2,77 |
| G11L |  | X | X |  | X |  |  |  |  | X | 2,19 |
| G12L |  | X |  | X | X |  |  |  |  | X | 1,70 |
| R1L |  | X | X |  |  |  |  | X | X |  | -24,96 |
| R2L |  | X |  | X |  |  |  | X | X |  | -19,40 |
| G1H | X |  | X |  |  |  | X |  | X |  | 15,86 |
| G2H | X |  |  | X |  |  | X |  | X |  | 12,33 |
| G3H | X |  | X |  |  | X |  |  | X |  | 9,57 |
| G4H | X |  |  | X |  | X |  |  | X |  | 7,43 |
| G5H | X |  | X |  | X |  |  |  | X |  | 5,87 |
| G6H | X |  |  | X | X |  |  |  | X |  | 4,57 |
| G7H | X |  | X |  |  |  | X |  |  | X | 3,47 |
| G8H | X |  |  | X |  |  | X |  |  | X | 2,70 |
| G9H | X |  | X |  |  | X |  |  |  | X | 2,10 |
| G10H | X |  |  | X |  | X |  |  |  | X | 1,63 |
| G11H | X |  | X |  | X |  |  |  |  | X | 1,29 |
| G12H | X |  |  | X | X |  |  |  |  | X | 1,00 |
| R1H | X |  | X |  |  |  |  | X | X |  | -14,68 |
| R2H | X |  |  | X |  |  |  | X | X |  | -11,41 |

Fig.10

HYBRID DRIVE TRAIN OF A MOTOR VEHICLE

This application is a National Stage completion of PCT/EP2009/061534 filed Sep. 7, 2009, which claims priority from German patent application serial no. 10 2008 041 887.0 filed Sep. 9, 2008.

FIELD OF THE INVENTION

The invention concerns a hybrid drive train of a motor vehicle, comprising an internal combustion engine with a driveshaft, an electric machine that can be operated as a motor and as a generator and which comprises a stator and a rotor, and a multi-stage transmission with an input shaft and an output shaft, such that the driveshaft of the internal combustion engine can be connected by a controllable separator clutch to the input shaft of the transmission, the electric machine is arranged coaxially over the input shaft, and the rotor of the electric machine is permanently in driving connection with the input shaft. The invention can be implemented in hybrid drive trains with a multi-stage planetary automatic transmission or a multi-stage manual gearshift transmission.

BACKGROUND OF THE INVENTION

In a conventional drive train of a motor vehicle a planetary automatic transmission is usually used in combination with a hydrodynamic torque converter. Via the torque converter the driveshaft of the internal combustion engine is in driving connection with the input shaft of the automatic transmission, such that by virtue of the hydraulic-elastic connection of the driveshaft of the internal combustion engine to the input shaft of the automatic transmission, both rotational vibrations of the driveshaft of the internal combustion engine and also shift-originating load pulses of the automatic transmission are damped and therefore transmitted only in a very weakened form to the respective other assembly, i.e. into the automatic transmission or into the internal combustion engine.

A further advantage of a torque converter is that when the vehicle is at rest or driving or rolling at low speed, the torque is amplified by a relatively large factor up to the value 2.5. Thanks to the resulting high starting torque, motor vehicles of this type have high starting acceleration and high climbing capacity from rest.

Furthermore, when the internal combustion engine is idling and a gear is engaged, a crawling torque is available by virtue of which, when starting on a hill, the motor vehicle is prevented from rolling backward when the driver changes from the brake pedal to the accelerator pedal, and thanks to which maneuvering on flat ground can be controlled by a harder or less hard actuation of the brake pedal alone.

A disadvantage of a torque converter, however, is that compared with a manual or automated shift transmission the fuel consumption is higher, as a result of the drive power required for an associated oil pump, the transmission slip within the torque converter and the higher idling power of the internal combustion engine required for the crawling torque.

In a drive train of a heavy utility vehicle, such as a heavy-load tractor or a self-propelling crane vehicle, a built-in manual gearshift transmission is usually connected to the internal combustion engine by a so-termed converter shifting clutch. A converter shifting clutch is an arrangement in series comprising a hydrodynamic torque converter and a controllable separator clutch, i.e. one that can be automatically engaged and disengaged. The torque converter, usually provided with a bridging clutch, serves when the bridging clutch is disengaged, the separator clutch is engaged and a starting gear is engaged, to enable jerk-free and wear-free starting. During this, when there is a large speed difference between the pump impeller and the turbine wheel of the torque converter, which occurs when the vehicle is at rest or moving at low driving or rolling speeds, a relatively large torque increase by a factor of up to 2.5 acts on the input shaft of the manual gearshift transmission. Thanks to the resultant high starting torque, motor vehicles of this type have comparatively high starting acceleration and high climbing capacity from rest. Furthermore, the crawling torque acting on the output shaft of the manual gearshift transmission in this operating condition prevents rolling backward when the driver changes from the brake pedal to the accelerator pedal while starting on a hill, whereas maneuvering on flat ground can be controlled by a harder or less hard actuation of the brake pedal alone. The separator clutch is now disengaged to allow load-free shifting of the gears of the manual gearshift transmission. At higher speeds and when higher gears are engaged the bridging clutch is usually engaged. However, to damp shift-originated load pulses by the torque converter it can be temporarily disengaged even when shifting between higher gears. The disadvantages of a converter, however, are the higher fuel consumption that results from the drive power for an associated oil pump of the torque converter, the transmission slip inside the torque converter when the bridging clutch is disengaged, and the higher idling power of the internal combustion engine required for producing the crawling torque.

If from conventional drive trains of that type a hybrid drive train is to be derived, then an electric machine that can be operated as a motor and generator can be provided instead of the hydraulic torque converter or a converter bridging clutch, so that the electric machine takes over the function of the torque converter at least in part. For the hybrid drive train so constituted to keep to the dimensions of a conventional drive train and thus to be able to be fitted in a motor vehicle in place of the latter without problems, the electric machine comprising a stator and a rotor is expediently arranged coaxially over the input shaft of the transmission, with the rotor of the electric machine in driving connection with the input shaft.

To compensate for a rotational speed difference between the driveshaft of the internal combustion engine and the input shaft of the transmission that exists when the vehicle is starting from rest, the driveshaft is connected to the input shaft by means of a controllable separator clutch, i.e. one that can be automatically engaged and disengaged, this separator clutch, however, in contrast to a converter shifting clutch, being arranged between the internal combustion engine and the input shaft of the manual gearshift transmission in driving connection with the electric machine.

During driving operation the electric machine can optionally be switched in without force, or used as a generator for charging an electrical energy accumulator, or used as an electric motor for driving the motor vehicle. During driving operation powered by the internal combustion engine, if the separator clutch is engaged, particularly when accelerating rapidly and driving up a steep uphill stretch, the electric machine can be used to support the internal combustion engine in so-termed 'boost' operation, whereas if the separator clutch is disengaged, particularly when starting off and when driving in urban areas with emission restrictions, it can be used on its own as the drive motor in purely electric driving operation. When the transmission is in neutral, the electric machine in combination with engaging the separator clutch can also be used for starting and for actively stopping the internal combustion engine.

Such a hybrid drive train with a transmission preferably in the form of a planetary automatic transmission is described, for example, in two versions in DE 199 17 665 A1. In the first embodiment variant illustrated by FIG. 1 in that document the driveshaft of the internal combustion engine can be connected by means of a controllable clutch to the input shaft of the automatic transmission. An electric machine that can be operated optionally as a motor or as a generator is arranged coaxially over the input shaft of the automatic transmission and the rotor of the electric machine is connected in a rotationally fixed manner directly to the input shaft of the automatic transmission. To supply oil to the automatic transmission an oil pump is provided, which can optionally be powered by actuating an associated clutch either by the driveshaft of the internal combustion engine or by an associated electric motor. In the second embodiment variant illustrated in FIG. 2 of the document the clutch for controlling the drive of the oil pump is arranged between the driveshaft of the internal combustion engine and a shaft section connected to the input element of the separator clutch for driving the oil pump.

Another hybrid drive train of this type with a planetary automatic transmission is known in two versions from DE 103 46 640 A1. In both versions of this known hybrid drive train, as illustrated in FIGS. 1 and 2 thereof, in each case an electric machine that can optionally be operated as a motor and as a generator is arranged coaxially over the input shaft of the automatic transmission and the rotor of the electric machine is in each case connected in a rotationally fixed manner directly to the input shaft of the automatic transmission. The driveshaft of the internal combustion engine, which is provided with a rotational vibration damper, can in each case be connected by a controllable separator clutch to the input shaft of the automatic transmission. In addition, a drive output element for an oil pump provided for supplying oil to the automatic transmission is in driving connection with the input shaft of the automatic transmission.

A further conventional hybrid drive train is described for example in DE 195 03 500 C2. The driveshaft of the internal combustion engine can be connected by a controllable separator clutch to the input shaft of the gearshift transmission. An electric machine that can be operated as a motor and a generator is arranged coaxially over the input shaft of the transmission, and the rotor of the electric machine is connected directly and in a rotationally fixed manner to the input shaft of the transmission. As a special feature of this known hybrid drive train the gearshift transmission does not comprise any reverse gearset for a reversing gear. Rather, to drive in reverse it is provided that the separator clutch is disengaged and the input shaft of the transmission is driven, with a forward gear engaged, by motor operation of the electric machine contrary to the rotation direction of the driveshaft of the internal combustion engine. In this operating condition the internal combustion engine can be switched off or run in the idling mode.

In these known hybrid drive trains it is disadvantageous that the speed of the electric machine connected to the input shaft in each case corresponds to that of the internal combustion engine, and accordingly, to produce sufficient drive power for purely electric driving operation the electric machine concerned must be relatively large and heavy. Furthermore, in boost-starting operation the increase of the engine torque of the internal combustion engine by the motor torque of the electric machine and hence the starting acceleration of the motor vehicle concerned and its climbing capacity from rest, particularly when starting uphill and when more heavily loaded, are relatively limited.

This disadvantage is at least partially overcome in a hybrid drive system described in DE 100 12 221 A1, which comprises a main drive train and an auxiliary drive train. In the main drive train, which corresponds to the hybrid drive train considered here, the electric machine concerned is arranged axis-parallel to the input shaft of the driving transmission, and the rotor of the electric machine is in driving connection with the input shaft of the driving transmission via an input transmission stage with a high gear ratio which can optionally be in the form of a spur gear pair or a belt-type transmission. The driving transmission is preferably in the form of a planetary automatic transmission, but can also be a manually or semi-automatically shifted variable-speed transmission.

By virtue of a high gear ratio of the input transmission stage, the speed of the electric machine is made slower and thus the torque of the electric machine acting upon the input shaft of the automatic transmission is correspondingly increased. This can be used to make the electric machine lower-powered and correspondingly smaller and lighter, or for electric-drive operation and boost operation, in particular when starting off uphill or with a heavier load, to provide a higher starting torque. The disadvantage of this known hybrid drive train, however, is it's large radial dimensions in the area of the electric machine and the input transmission stage, because of which fitting it into a motor vehicle as an alternative to a conventional drive train is not possible without major modifications of the vehicle chassis or vehicle body.

A further problem of the hybrid drive trains mentioned above is that the traction force is particularly weak during internal combustion engine operation, especially when starting and maneuvering. It is true that with appropriate design of the electric machine, during boost operation of the electric machine a relatively high starting torque can be produced at the input shaft of the automatic transmission. However, this is only possible when the energy accumulator for supplying the electric machine is sufficiently charged. On the other hand, if starting has to be carried out with the internal combustion engine alone and if an internal combustion engine of comparable torque power is used, due to the lack of additional torque from a torque converter only a substantially lower starting torque is now available, which is moreover delivered to the input shaft of the automatic transmission with slipping operation of the separator clutch that in this case acts as the starting clutch. As a result, compared with a conventional drive train the starting acceleration and climbing capacity on starting obtained are substantially lower. In addition, during internal combustion engine operation for starting and maneuvering there is a risk of overheating the separator clutch.

SUMMARY OF THE INVENTION

Accordingly, the purpose of the present invention is to propose a hybrid drive train of the type indicated at the start with a multi-stage automatic transmission or a multi-stage manual gearshift transmission, which provides a starting acceleration and climbing capacity on starting which correspond to those of a conventional drive train with an automatic transmission and a hydrodynamic torque converter connected upstream therefrom or a conventional drive train with a manual gearshift transmission and a converter shifting clutch upstream therefrom. A further objective of the present invention is to design and arrange the hybrid-specific components in such manner that the hybrid drive train according to the invention can be integrated in a motor vehicle as an alternative to a conventional drive train, without having to modify the vehicle chassis or vehicle body.

The rotor of the electric machine is in drive connection with the input shaft of the transmission concerned via an input transmission stage with a high gear ratio ($i_{EK}$>1) in the form of a simple planetary gearset with a sun gear, a plurality of planetary gears which are distributed around the periphery of a planetary carrier, are mounted to rotate, and mesh with the sun gear, and a ring gear which meshes with the planetary gears, whereas the sun gear is fixed relative to a component attached to the housing, the ring gear is connected in a rotationally fixed manner to the rotor of the electric machine, and the planetary carrier is connected in a rotationally fixed manner to the input shaft of the automatic transmission.

In the hybrid drive train according to the invention the transmission can be a multi-stage planetary automatic transmission or a multi-stage gearshift transmission, in the latter case even one that can be shifted semi-automatically.

Thanks to the use of an input transmission stage in the form of a simple planetary gearset for connecting the rotor of the electric machine to the input shaft of the automatic transmission, on the one hand a high gear ratio $i_{EK}$ of the speed and torque of the electric machine, of up to $i_{EK}$=1.8, and on the other hand a compact structure of the input transmission stage are achieved. If a preferred input transmission stage gear ratio of $i_{EK}$=1.8 is used, the speed of the electric machine EM is reduced by about 40% and the torque of the electric machine is increased by 70%. According to need this can be used to make the electric machine with less torque power and thus more compact and lighter, or the higher torque can be applied at the input shaft of the automatic transmission to increase the starting acceleration and the climbing capacity of the motor vehicle concerned on starting, in electric drive and boost operation.

When the input transmission stage is made as a planetary gearset, there are in addition comparatively small relative speeds between the rotating components, such as between the sun gear and the planetary carrier and between the planetary carrier and the ring gear, and this results in relatively greater transmission efficiency.

In accordance with the first objective of the invention, to increase the engine torque of the internal combustion engine when necessary it is in addition preferable to provide a second controllable separator clutch by means of which the driveshaft of the internal combustion engine can be connected to the ring gear of the input transmission stage.

Thanks to this additional, second separator clutch the driveshaft of the internal combustion engine can when necessary be connected to the ring gear that forms the input element of the input transmission stage, so that the force flow from the internal combustion engine to the input shaft of the transmission in this case also takes place via the input transmission stage. This steps up the torque of the internal combustion engine by the gear ratio $i_{EK}$ of the input transmission stage and steps down the speed of the internal combustion engine correspondingly. As a result, even during starting off and maneuvering the speed difference to be bridged by the second separator clutch in slipping operation is reduced, so that the thermal loading of the second separator clutch is relatively low.

Thus, due to the use of the second separator clutch the input transmission stage is made available for the internal combustion engine as a range group upstream from the transmission, i.e. a slow-driving range is formed by doubling the gears of the transmission available. Needless to say, for this the torque strength of the input transmission stage must be designed accordingly.

In order to conform to the dimensions of a conventional drive train in accordance with the second objective of the invention, it is additionally provided that the electric machine, the separator clutches and the input transmission stage are arranged coaxially with one another and with the driveshaft of the internal combustion engine and the input shaft of the transmission, and are combined in a pre-assembled hybrid module with an input element, an output element, and a module housing, whose input element is connected in a rotationally fixed manner to the driveshaft of the internal combustion engine, whose output element is connected in a rotationally fixed manner to the input shaft of the transmission, and which, in combination with a multi-stage planetary automatic transmission, conforms to the dimensions of a hydrodynamic torque converter, or in combination with a multi-stage manual gearshift transmission, conforms to those of a converter shifting clutch that could otherwise be used.

Thus, apart from a larger energy accumulator for the electric machine, which can be arranged elsewhere in the motor vehicle, the hybrid drive train according to the invention is different from a conventional drive train only in having the hybrid module in place of the hydrodynamic torque converter or converter shifting clutch. In the hybrid drive train according to the invention the transmission of the conventional drive train can remain unchanged, but thanks to the use of the second separator clutch a larger number of gear ratio steps and a correspondingly large transmission spread are available. Furthermore, owing to the large total production run of the main transmission used there are distinct cost advantages compared with known solutions with hybrid-specific transmission designs, since these main transmissions, whether planetary automatic or manual gearshift transmissions, can also be used in conventional drive trains.

To achieve more compact dimensions of the hybrid module it is preferably provided that the electric machine is designed with an internal rotor having its rotor radially inside the stator, and that the at least one separator clutch is positioned on the engine side and the input transmission stage on the transmission side, at least radially within the rotor.

From this standpoint it is also advantageous for the at least one separator clutch to be made as a disk clutch, respectively with an inner disk carrier and an outer disk carrier.

The two separator clutches K1, K2 can be arranged axially next to one another, such that the inner disk carriers of the two separator clutches are preferably connected to one another and to the input element of the hybrid module, the outer disk carrier of the first separator clutch K1 is connected to the output element of the input transmission stage or the hybrid module, and the outer disk carrier of the second separator clutch K2 is connected to the ring gear of the input transmission stage.

Alternatively, however, it is also possible for the two separator clutches to be arranged coaxially with one another with a radially inner first separator clutch K1 and a radially outer second separator clutch K2, such that the outer disk carrier of the first separator clutch K1 and the inner disk carrier of the second separator clutch K2 are connected to one another and to the input element of the hybrid module, and the inner disk carrier of the first separator clutch K1 is connected to the output element of the input transmission stage or the hybrid module and the outer disk carrier of the second separator clutch K2 is connected to the ring gear of the input transmission stage.

In order to effectively attenuate the unavoidable rotary oscillations of the crankshaft that forms the driveshaft of a piston engine, the input element of the hybrid module expediently consists of two components that can rotate relative to one another to a limited extent, connected to one another by a rotary oscillation damper. Thus, the rotary oscillation damper is also part of the hybrid module and can be arranged on the engine side either radially within, or axially close to the rotor of the electric machine.

In a simple and space-saving manner the rotor of the electric machine can be mounted within the module housing by a two-point mounting arrangement consisting of a fixed mounting and a loose mounting.

In principle, the two mountings can be formed by two roller bearings, which can for example be arranged respectively between a component attached to the rotor and a component fixed to the housing. However, to achieve more compact dimensions and save one roller bearing, it is particularly advantageous for only the fixed mounting of the rotor to be formed by a roller bearing arranged on the engine side between a component attached to the rotor and a component connected to the housing of the module, whereas the loose mounting of the rotor is formed by the gearteeth and mountings of the components in the input transmission stage.

BRIEF DESCRIPTION OF THE DRAWINGS

To clarify the invention, the description of drawings with example embodiments is attached. The drawings show:

FIG. 2: Shift and gear ratio scheme of an automatic transmission according to FIGS. 1, 6 and 7, FIG. 3: A first variant of a second embodiment of the hybrid drive train according to the invention with a planetary automatic transmission, FIG. 5: Shift and gear ratio scheme of the hybrid drive train according to the invention with a planetary automatic transmission shown in FIG. 2 and FIG. 3, FIG. 6: A conventional drive train with a planetary automatic transmission and a hydrodynamic torque converter, represented schematically, FIG. 10: Shift and gear ratio scheme of the hybrid drive train with a gearshift transmission shown in FIGS. 8 and 9.

DETAILED DESCRIPTION OF THE PREFERRED EMBODIMENTS

Figure 6:
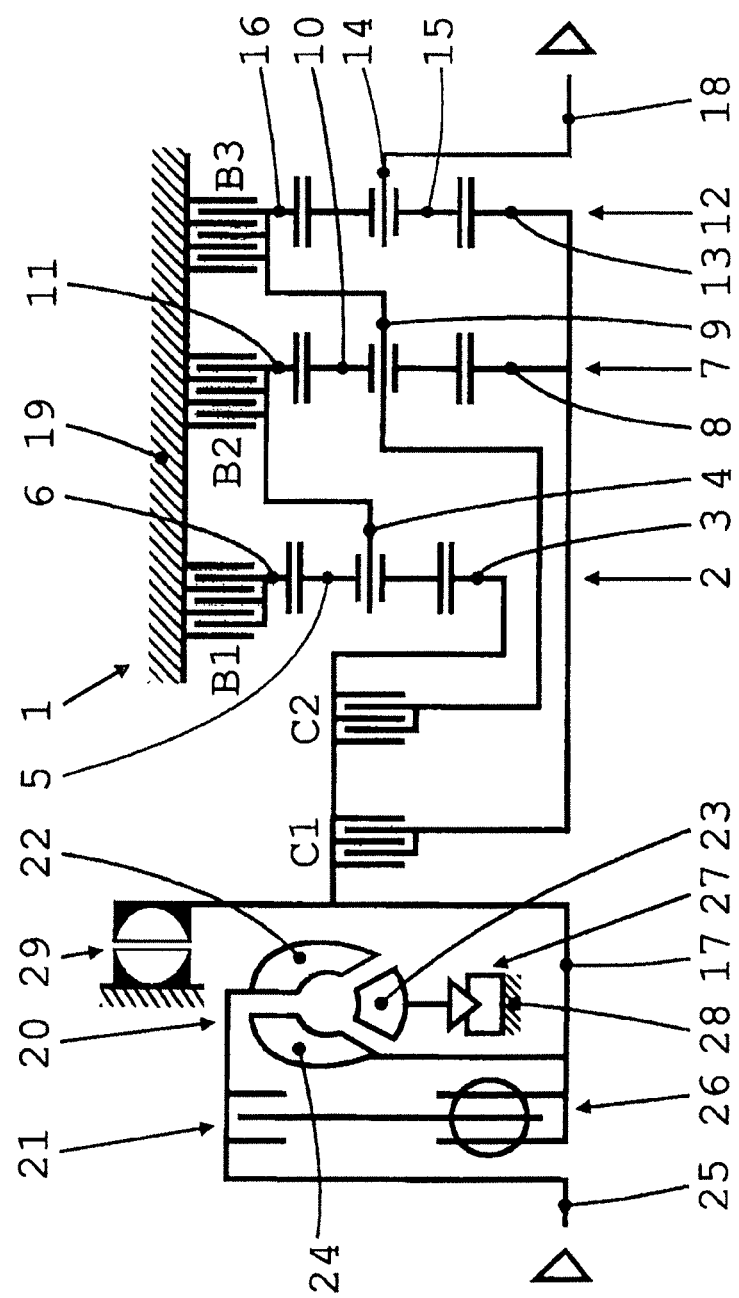

As shown in FIG. 6, a conventional drive train comprises a planetary automatic transmission 1 with an input shaft 17, an output shaft 18 and a hydrodynamic torque converter 20 connected upstream therefrom. The automatic transmission 1, which for example is the same as the known EcoLife range-change automatic transmission from the production range of the present applicant, preferably provided for use in urban buses, comprises three planetary gearsets 2, 7 and 12 coupled one to another, each consisting of a sun gear 3, 8, 13, a planetary carrier 4, 9, 14 and a ring gear 6, 11, 16 respectively. Mounted to rotate on the planetary carriers 4, 9, 14 there are in each case a plurality of circumferentially distributed planetary gears 5, 10, 15, which respectively mesh on the one hand with the associated sun gear 3, 8, 13 and on the other hand with the associated ring gear 6, 11, 16.

The input shaft 17 of this known automatic transmission 1 is rigidly connected to the sun gear 3 of the first planetary gearset 2. The planetary carrier 4 of the first planetary gearset 2 is rigidly coupled to the ring gear 11 of the second planetary gearset 7, and the planetary carrier 9 of the second planetary gearset 7 is rigidly connected to the ring gear 16 of the third planetary 12. The planetary carrier 14 of the third planetary gearset 12 is rigidly connected to the output shaft 18 of the automatic transmission 1, which is in driving connection with an axle drive of a driven vehicle axle such as an axle differential or a transfer box.

The automatic transmission 1 comprises five frictionally acting shift elements, namely two shift clutches C1, C2 and three shift brakes B1, B2, B3, which serve to engage six forward gears G1, G2, G3, G4, G5, G6 and one reverse gear R. By engaging the first shift clutch C1 the input shaft 17 is connected to the sun gear 8 of the second planetary gearset 7 and to the sun gear 13 of the third planetary gearset 12. By means of the second shift clutch C2 the input shaft 17 can be connected to the planetary carrier 9 of the second planetary gearset 7 and to the ring gear 16 of the third planetary gearset 12.

By engaging the first shift brake B1 the ring gear 6 of the first planetary gearset 2 is held fixed relative to the transmission housing 19. By means of the second shift brake B2 the planetary carrier 4 of the first planetary gearset 2 and the ring gear 11 of the second planetary gearset 7 can be held fixed relative to the transmission housing 19. By engaging the third shift brake B3 the planetary carrier 9 of the second planetary gearset 7 and the ring gear 16 of the third planetary gearset 12 are held fixed relative to the transmission housing 19.

The shift scheme of this automatic transmission 1 is indicated together with example values of gear ratios i in the table shown as FIG. 2, in which shift elements which are engaging are in each case marked with a cross. From the structure of the automatic transmission 1 and the arrangement of the shift elements C1, C2, B1, B2, B3 it results that to engage the gears G1 to G6 and R, in each case only two shift elements have to be engaged and, to shift between two adjacent gears, for example to shift from first gear G1 to second gear G2, in each case only one shift element has to be disengaged and another shift element engaged.

On the input side, a hydrodynamic torque converter 20 provided with a bridging clutch 21 is connected upstream from the automatic transmission 1. The torque converter 20 consists of a pump impeller wheel 22, a guide wheel 23 and a turbine wheel 24, surrounded by a housing (not shown in full). The pump impeller wheel 22 is rigidly connected to an input shaft 25 which is connected in turn to the driveshaft of an internal combustion engine (not shown), and which can, when necessary, be connected to the input shaft 17 of the automatic transmission 1 via the bridging clutch 21 and a vibration damper 26. The guide wheel 23 is connected to a housing component 28 via a freewheel clutch 27, whereby rotation of the guide wheel 23 opposite to the rotation direction of the drive engine is prevented. The turbine wheel 24 is rigidly connected to the input shaft 17 of the automatic transmission 1.

If there is a large rotational speed difference between the pump impeller wheel 22 and the turbine wheel 24, which occurs in particular when the vehicle is at rest, i.e. when the turbine wheel 24 is braked, then when the bridging clutch 21 is disengaged the torque applied on the turbine wheel 24 and the input shaft 17 of the automatic transmission 1 is increased, compared to the torque to be applied by the drive engine on the pump impeller wheel 22, approximately by a factor of 2.5 and acts as a so-termed crawling torque. To relieve the load on the wheel brakes of the motor vehicle concerned a permanent brake in the form of a primary retarder 29 arranged on the input shaft 17 of the automatic transmission 1 is also present.

Figure 7:
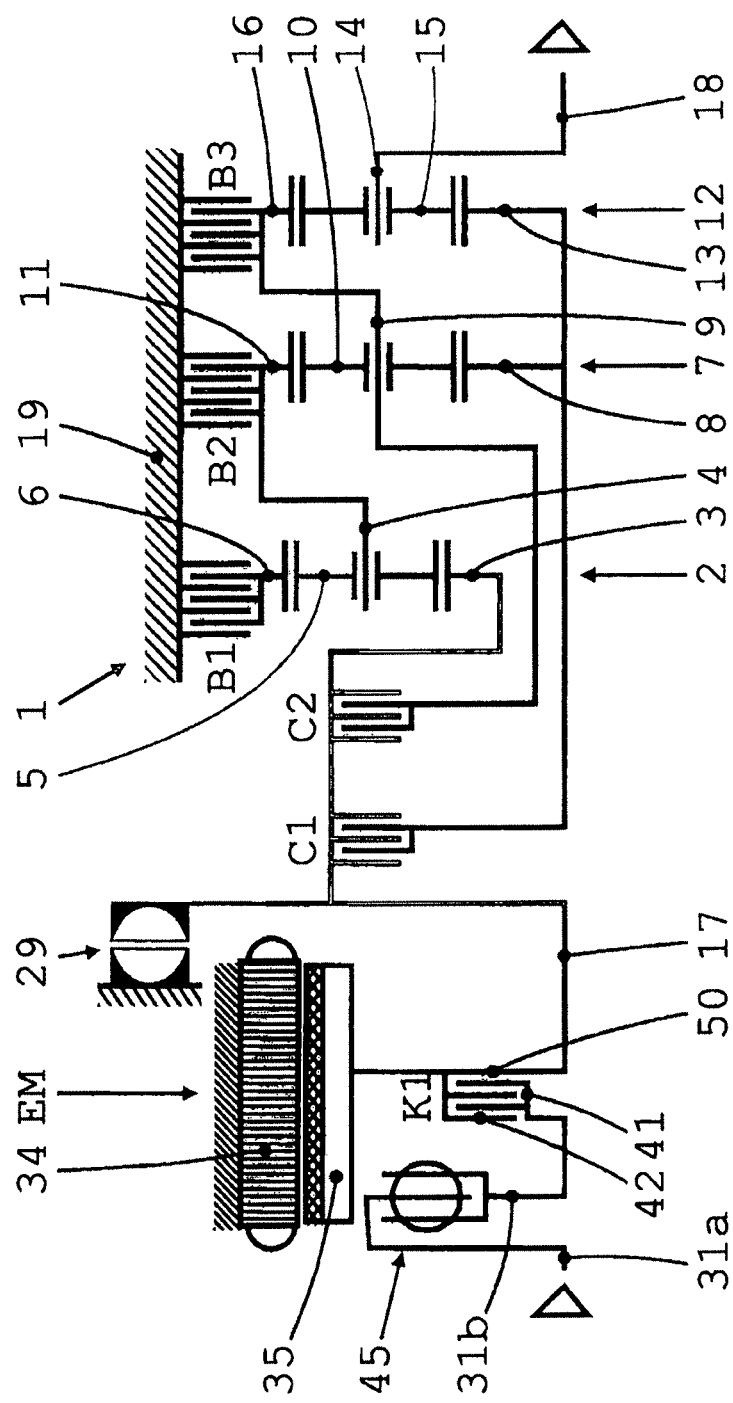
FIG. 7: A known hybrid drive train with a planetary automatic transmission and a coaxially arranged electric machine, represented schematically.

In a hybrid drive train known in principle for example from DE 103 46 640 A1 and illustrated in FIG. 7, upstream from the automatic transmission 1 from FIG. 6, which is kept unchanged, there is connected, in place of the hydrodynamic torque converter 20, an electric machine EM which can be operated as a motor and generator. The electric machine EM is designed as an internal-rotor machine with a radially outer stator 34 fixed to the housing as well as a rotor 35 arranged radially inside the stator 34. The rotor 35 of the electric machine EM is connected in a rotationally fixed manner to the input shaft 17 of the automatic transmission 1 via a bearing disk 50.

The driveshaft of the internal combustion engine (not shown) can be connected to the input shaft 17 of the automatic transmission 1 by a separator clutch K1 in this case made as a disk clutch with an inner disk carrier 41 on the input side and an outer disk carrier 42 on the output side. The inner disk carrier 41 of the separator clutch K1 is connected, by an input element 31 consisting of two components 31a, 31b connected to one another by a rotational oscillation damper 45, to the driveshaft of the internal combustion engine, relative to which it can undergo limited rotation. The outer disk carrier 42 of the separator clutch K1 is rigidly connected to the bearing disk 50 of the electric machine EM.

The shift and gear ratio scheme of the automatic transmission 1 corresponds with that of the conventional drive train of FIG. 6 (see the table shown as FIG. 2). Owing to the direct connection of the electric machine EM and the internal combustion engine to the input shaft 17 of the automatic transmission 1, the motor vehicle concerned has limited starting acceleration and climbing capacity on starting.

Figure 1:
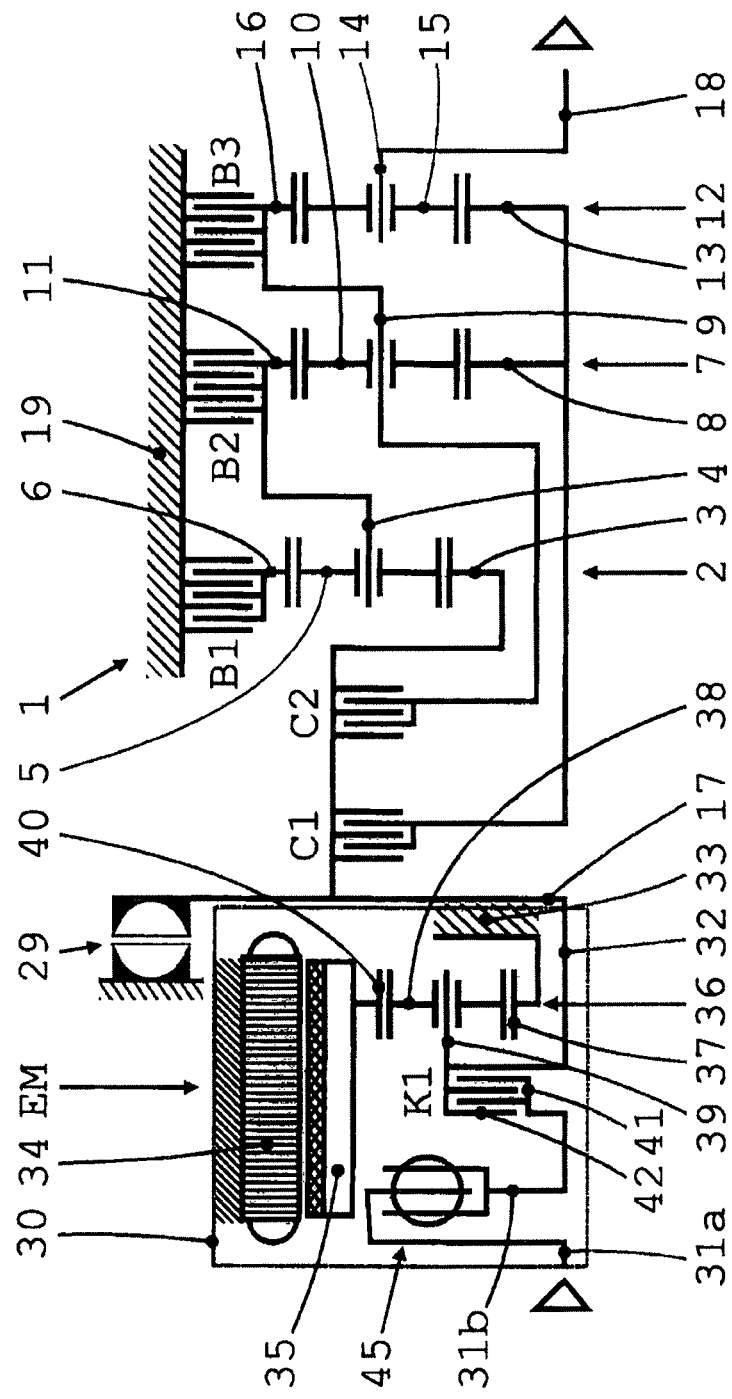
FIG. 1: A first embodiment of the hybrid drive train according to the invention with a planetary automatic transmission.

In a first embodiment of the hybrid drive train according to the present invention, shown in FIG. 1, upstream from the automatic transmission 1, which is the same as that of FIG. 6, there is connected, instead of the hybrid torque converter 20, a hybrid module 30 with an input element 31 and an output element 32. The hybrid module 30 comprises an electric machine EM that can be operated as a motor and as a generator, and a controllable separator clutch K1, i.e. one that can be engaged and disengaged automatically, for coupling the internal combustion engine when necessary. The electric machine EM is formed as an internal-rotor machine with a radially outer stator 34 fixed to a module housing 33 and a rotor 35 arranged radially inside the stator 34. In contrast to the known hybrid drive train of FIG. 7, however, the rotor 35 is now in driving connection with the output element 32 via an input transmission stage 36.

The input transmission stage 36 is designed as a simple planetary gearset and is arranged on the transmission side coaxially inside the rotor 35 of the electric machine EM. The input transmission stage 36 comprises a sun gear 37 permanently fixed on the module housing 33, a group of planetary gears 38 which mesh with the sun gear 37 and are also mounted to rotate on a common planetary carrier 39, and a ring gear 40 which meshes with the planetary gears 38 and is connected permanently and in a rotationally fixed manner to the rotor 35 of the electric machine EM. Thus, the input transmission stage can have a gear ratio $i_{EK}$ of between 1.2 and 1.8, although the highest possible gear ratio, $i_{EK}=1.8$, is preferred.

The separator clutch K1 is made as a disk clutch with an inner disk carrier 41 on the input side and an outer disk carrier 42 on the output side, arranged radially inside the rotor 35 of the electric machine EM. Analogously to the hybrid drive train in FIG. 7, the inner disk carrier 41 is connected, by an input element 31 consisting of two components 31a, 31b connected to one another by a rotational oscillation damper 45, to the driveshaft of the internal combustion engine relative to which it can rotate to a limited extent. The outer disk carrier 42 is connected in a rotationally fixed manner to the planetary carrier 39, which forms the output element of the input transmission stage 36.

Whereas in a manner known per se the internal combustion engine can be connected directly by the first separator clutch K1 to the input shaft 17 of the automatic transmission 1, the rotor 35 of the electric machine EM is permanently connected via the input transmission stage 36 to the input shaft 17 of the automatic transmission 1. Thereby, the speed of the electric machine EM is reduced in proportion to the gear ratio $i_{EK}$ of the input transmission stage 36 and the torque of the electric machine EM is correspondingly increased. Accordingly, during electric driving and boost operation a higher torque is obtained at the input shaft 17 of the automatic transmission 1, whereby the motor vehicle concerned has higher starting acceleration and climbing capacity on starting. Owing to the structure and arrangement of the components EM, 36 and K1, the hybrid module 30 can have the same dimensions as a hydrodynamic torque converter 20 so that the hybrid drive train according to FIG. 1 can be integrated without problems in an already existing motor vehicle model as an alternative to the conventional drive train of FIG. 6. The shift and gear ratio scheme relating to the automatic transmission 1 is shown in the table of FIG. 2 and is thus identical to that of the conventional drive train according to FIG. 6.

Figure 3:
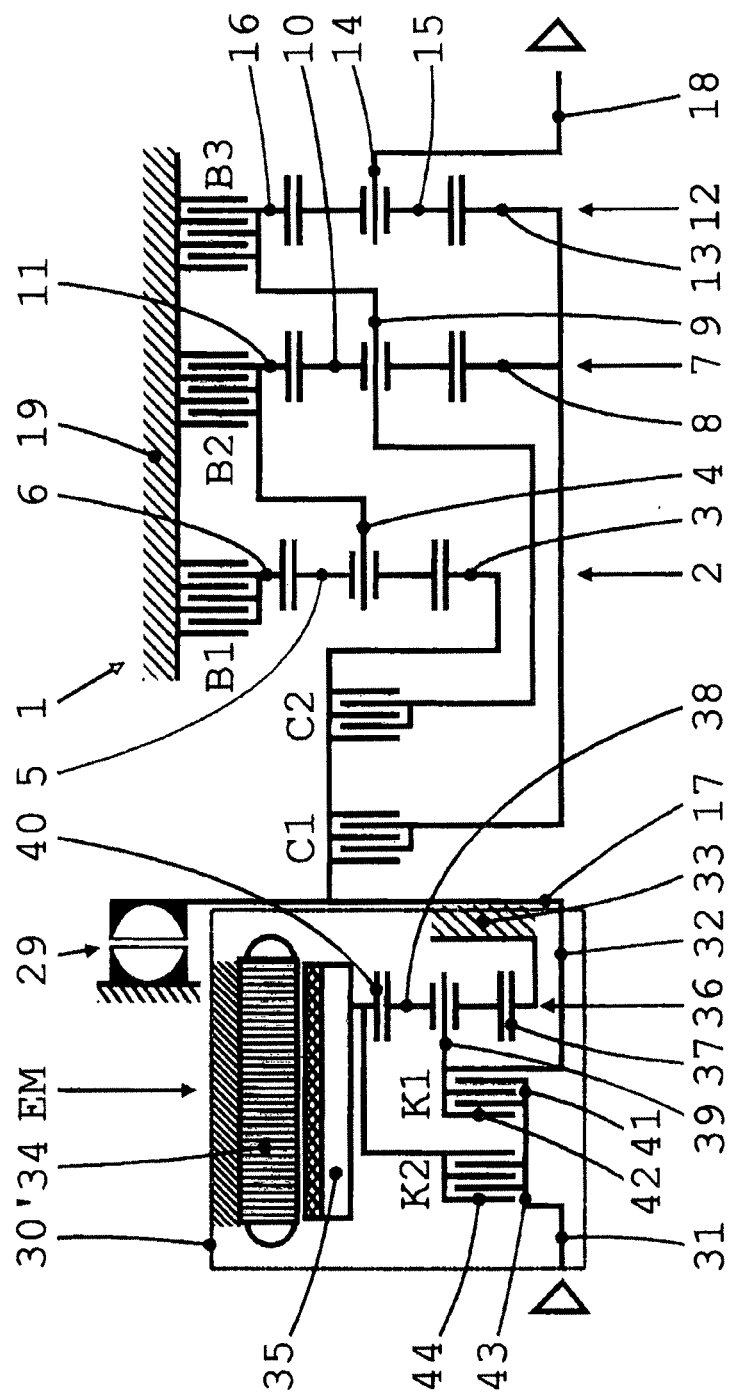

In a first variant of a second embodiment of the hybrid drive train according to the invention shown in FIG. 3, as an advantageous further development of the hybrid drive train according to the invention shown in FIG. 1 a second, additional controllable separator clutch K2 is present, by means of which the driveshaft of the internal combustion engine can be connected to the ring gear 40 of the input transmission stage 36.

The two separator clutches K1, K2 are both in the form of disk clutches, respectively with an inner disk carrier 41, 43 and an outer disk carrier 42, 44, and are arranged axially next to one another radially inside the rotor 35 of the electric machine. The inner disk carriers 41, 43 of the two separator clutches K1, K2 are connected with one another and to the input element 31 of the hybrid module 30'. The outer disk carrier 42 of the first separator clutch K1 is connected in a rotationally fixed manner to the planetary carrier 39 that forms the output element of the input transmission stage 36. The outer disk carrier 44 of the second separator clutch K2 is coupled in a rotationally fixed manner to the ring gear 40 that forms the input element of the input transmission stage 36.

Whereas in a manner known per se the internal combustion engine can be connected by the first separator clutch K1 directly to the input shaft 17 of the automatic transmission 1, as an alternative a driving connection of the internal combustion engine to the input shaft 17 of the automatic transmission 1, which passes via the input transmission stage 36, can be formed by means of the second separator clutch K2. In this way, for the internal combustion engine the input transmission stage 36 is made available as a range group upstream from the automatic transmission 1, whereby, by doubling the gears available (G1L-G6L, RL; G1H-G6H, RH) and correspondingly increasing the transmission spread, an additional slow-driving range with increased input torque of the automatic transmission 1 is produced. Thus, when the second separator clutch K2 is engaged, owing to the fact that the torque is increased by the gear ratio $i_{EK}$ of the input transmission stage 36, a higher starting acceleration and increased climbing capacity of the motor vehicle concerned on starting are obtained during both internal combustion engine driving and combination driving operation. Thanks to the structure and arrangement of the components EM, 36, K1 and K2, the hybrid module 30' can preserve the dimensions of a hydrodynamic torque converter 20 in this embodiment as well.

The associated shift scheme and gear ratios i of the hybrid drive train according to the invention shown in FIG. 3 are summarized in the table shown as FIG. 5, which was based on a gear ratio $i_{EK}$ of the input transmission stage 36 of $i_{EK}$=1.8.

When the second separator clutch K2 is engaged, the higher gear ratios i of the slow-driving range (G1L-G6L, RL) are applicable for both the internal combustion engine and the electric machine EM, since the force flow from both drive machines passes through the input transmission stage 36.

When the first separator clutch K1 is engaged, the gear ratios i which are usual in themselves, namely those of the fast-driving range (G1H-G6H, RH) are applicable only for the internal combustion engine, since the torque of the electric machine EM is still transmitted to the input shaft 17 of the automatic transmission 1 via the input transmission stage 36. Needless to say, for purely electric driving operation both separator clutches K1 and K2 are disengaged, so that the internal combustion engine can be switched off to save fuel.

Figure 4:
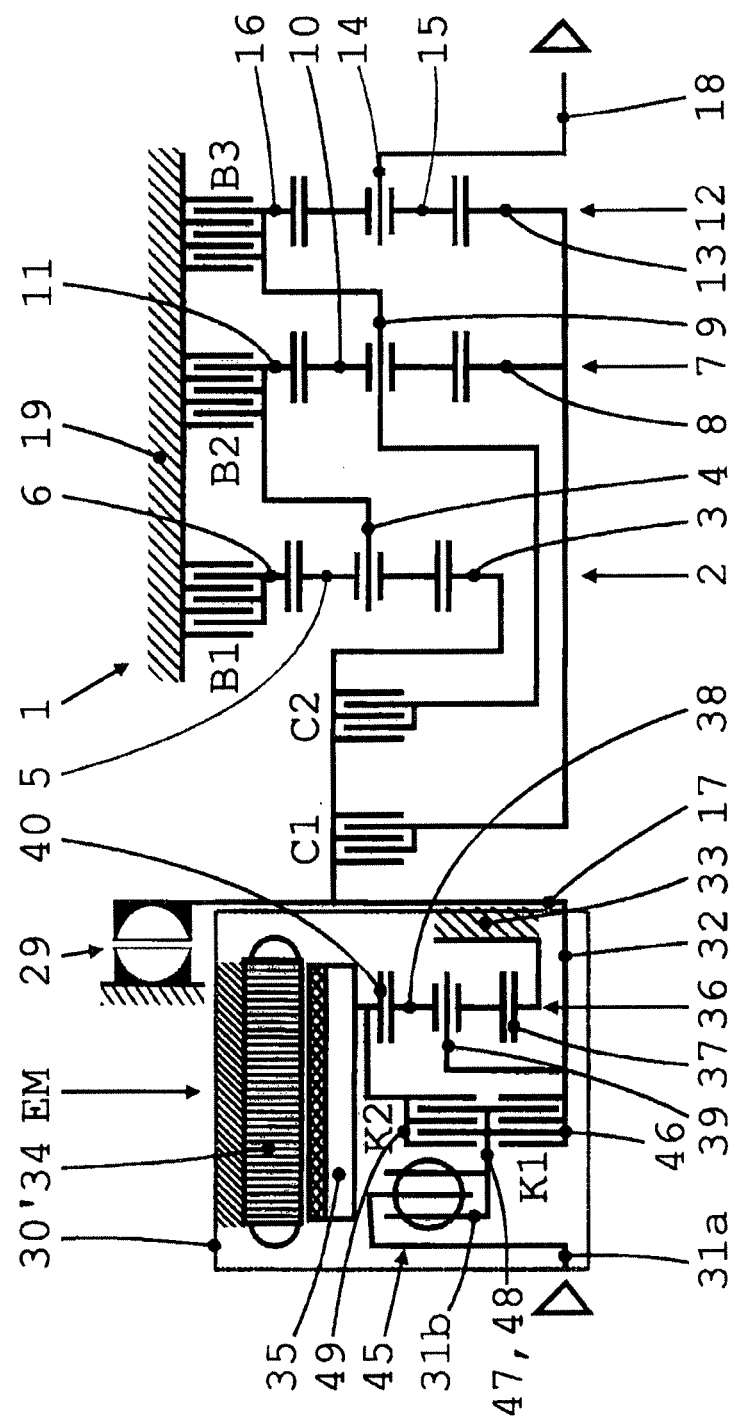
FIG. 4: A second variant of the second embodiment of the hybrid drive train according to the invention with a planetary automatic transmission.

A second variant of the second embodiment of the hybrid drive train according to the invention, shown in FIG. 4, differs from the first variant in FIG. 3 only in that the structure of the input element 31 of the hybrid module 30 and the arrangement of the two separator clutches K1, K2 are different. In this case the input element 31 of the hybrid module 30' consists of two components 31a, 31b which can rotate relative to one another to a limited extent and are connected to one another by a rotation oscillation damper 45. The two separator clutches K1, K2 are now arranged coaxially with one another with the first separator clutch K1 arranged radially on the inside and with the second separator clutch K2 radially on the outside, and the outer disk carrier 47 of the first separator clutch K1 and the inner disk carrier 48 of the second separator clutch K2 are connected to one another and to the second component 31b of the input element 31 of the hybrid module 30. The inner disk carrier 46 of the first separator clutch K1 is in this case connected in a rotationally fixed manner directly to the output element 32 of the hybrid module 30', and the outer disk carrier 49 of the second separator clutch K2 is connected in a rotationally fixed manner to the ring gear 40 which forms the input element of the input transmission stage 36.

The drive trains according to the invention comprise in each case a multi-stage manual gearshift transmission 51, 51' with an input shaft 52, an output shaft 53 and a hybrid module 60, 60' connected upstream therefrom with an input element 61 and an output element 62.

The gearshift transmission 51, 51', which for example corresponds to an embodiment known per se of a semi-automatic gearshift transmission of the AS-Tronic series by the present applicant preferably provided for use in heavy utility vehicles, is in the form of a group transmission and consists of a main transmission HG, a splitter group VG connected upstream from it and a range group BG connected downstream from the main transmission HG.

The main transmission HG is designed as a direct-gear transmission of countershaft structure and comprises a main shaft 54 and two countershafts 55a, 55b. In the embodiment shown in FIG. 8 and FIG. 9 the main transmission HG is a three-stage configuration with three gear steps C1, G2 and G3 for forward driving and on gear R for reversing. The loose wheels of the gears C1, G2 and R are in each case mounted to rotate on the main shaft 54 and can be engaged by associated claw clutches E, D, F. The associated fixed wheels are arranged on the countershafts 55a, 55b in a rotationally fixed manner. The highest gear step G3 is designed as a direct gear and can be engaged by a direct shift clutch C. The shift clutches C, D, E, F in this case are designed without synchronization, and are brought together in respective pairs in a common shifting packet S2 or S3.

The upstream group VG is a two-stage structure also configured with countershafts, such that the two gear steps E1, E2 form two shiftable input constants of the main transmission HG. By virtue of a small gear ratio difference between the two gear steps E1, E2 the upstream group is designed as a splitter group. The loose wheel of the first gear step E1 is mounted to rotate on the input shaft 52, which is connected in a rotationally fixed manner to the output element 62 of the hybrid module 60, 60'. The loose wheel of the second gear step E2 is mounted to rotate on the main shaft 54. The fixed wheels of the two gear steps E1, E2 are in each case arranged in a rotationally fixed manner on the countershafts 55a, 55b extended on the input side. The two shift clutches A and B of the splitter group VG, in this case designed as synchronized clutches, are brought together in a common shifting packet S1.

The range group BG in driving connection downstream is also a two-stage design, but is of planetary structure with a simple planetary gearset. The sun gear 56 is connected rotationally fixed on the main shaft 54 extended in the output direction. The planetary carrier 57 carries planetary gears 58 and is connected in a rotationally fixed manner with the output shaft 53 of the gearshift transmission 51, 51'. The ring gear 59 is connected to a shift packet S4 with two shift clutches G, H by means of which the range group BG can be shifted to a slow-driving stage L by the connection G of the ring gear 59 to a fixed part of the housing, and to a fast-driving stage H by the connection H of the ring gear 59 to the main shaft 54 or to the sun gear 56. The shift clutches G, H for the shift packet S4 are in this case of synchronized design.

The hybrid module 60 comprises an electric machine EM that can be operated as a motor and as a generator, a controllable first separator clutch K1, i.e. one that can be automatically engaged and disengaged, for the direct coupling of the internal combustion engine to the input shaft 52 of the gearshift transmission 51, 51', and a controllable second separator clutch K2 for connecting the driveshaft of the internal combustion engine to the input shaft 52 of the gearshift transmission 51 via a input transmission stage 63. The electric machine EM is designed as an internal-rotor motor with a radially outer stator 65 fixed to a module housing 64 and a rotor 66 arranged radially inside the stator. The rotor 66 is in driving connection with the output element 62 of the hybrid module 60 via input transmission stage 63.

The input transmission stage 63 is in the form of a simple planetary gearset and on its transmission side is arranged coaxially inside the rotor 66 of the electric machine EM. The input transmission stage 63 comprises a sun gear 67 permanently fixed on the module housing 64, a group of planetary gears 68 which mesh with the sun gear 67 and are mounted to rotate on a common planetary carrier 69, and a ring gear 70 which meshes with the planetary gears 68 and is permanently connected in a rotationally fixed manner with the rotor 66 of the electric machine EM. The input transmission stage 63 can therefore have a gear ratio $i_{EK}$ between 1.2 and 1.8, although the highest possible gear ratio of $i_{EK}$=1.8 is preferred.

The two separator clutches K1, K2 are formed as disk clutches with respective inner disk carriers 71, 73 and respective outer disk carriers 72, 74, and are arranged axially adjacent to one another inside the rotor 66 of the electric machine EM. The inner disk carriers 71, 73 of the two separator clutches K1, K2 are connected to one another and to the input element 61 of the hybrid module 60. The outer disk carrier 72 of the first separator clutch K1 is connected in a rotationally fixed manner to the planetary carrier 69 that forms the output element of the input transmission stage 63. The outer disk carrier 74 of the second separator clutch K2 is connected in a rotationally fixed manner to the ring gear 70 that forms the input element of the input transmission stage 63.

Whereas the internal combustion engine (not shown separately) can be connected in a manner known per se directly to the input shaft 52 of the gearshift transmission 51, 51', as an alternative, a drive connection of the internal combustion engine to the input shaft 52 of the gearshift transmission 51, passing via the input transmission stage 63, can be formed by means of the second separator clutch K2. In this way, for the internal combustion engine the input transmission stage 63 can be made available as a range group connected upstream from the gearshift transmission 51, 51', whereby the gears available (G1L to G12L and R1L, R2L; G1H to G12H and R1H, R2H) are doubled and also a corresponding increase of the spread of the transmission is obtained by producing an additional slow-driving range with a higher input torque of the gearshift transmission 51, 51'.

Thus, when the second separator clutch K2 is engaged, owing to the torque increase that results from the gear ratio $i_{EK}$ of the input transmission stage 63, both during internal combustion engine driving operation and during combined driving operation, the motor vehicle concerned has higher starting acceleration and greater climbing capacity from rest. Thanks to the structure and compact arrangement of the electric machine EM, the input transmission stage 63, the separator clutch K1 and the separator clutch K2, the hybrid module 60 can conform to the dimensions of a conventional converter shifting clutch and can therefore easily be exchanged for one of the latter in an existing vehicle model.

Figure 8:
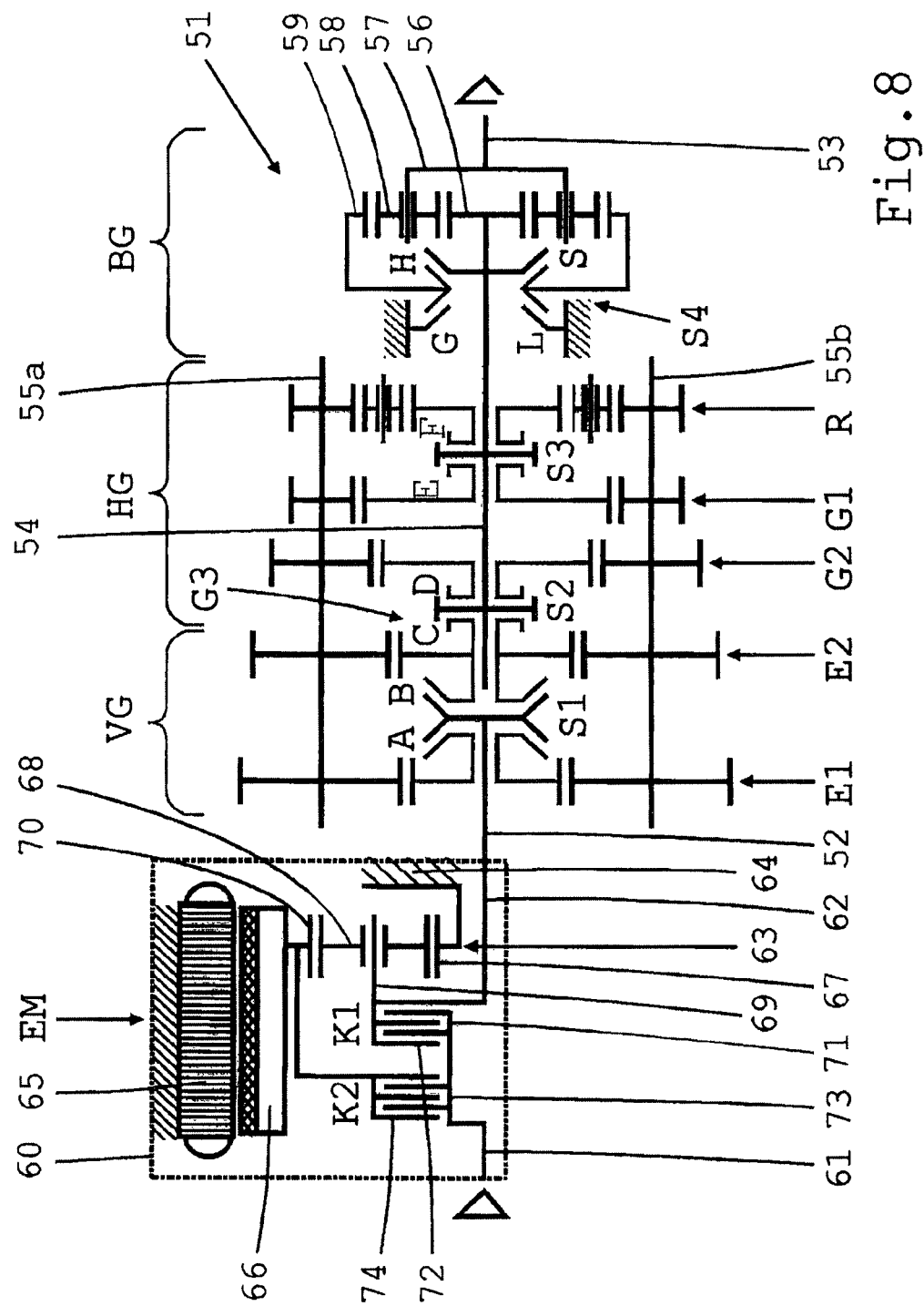
FIG. 8: A third embodiment of the hybrid drive train according to the invention, with a manual gearshift transmission, represented schematically.
Figure 9:
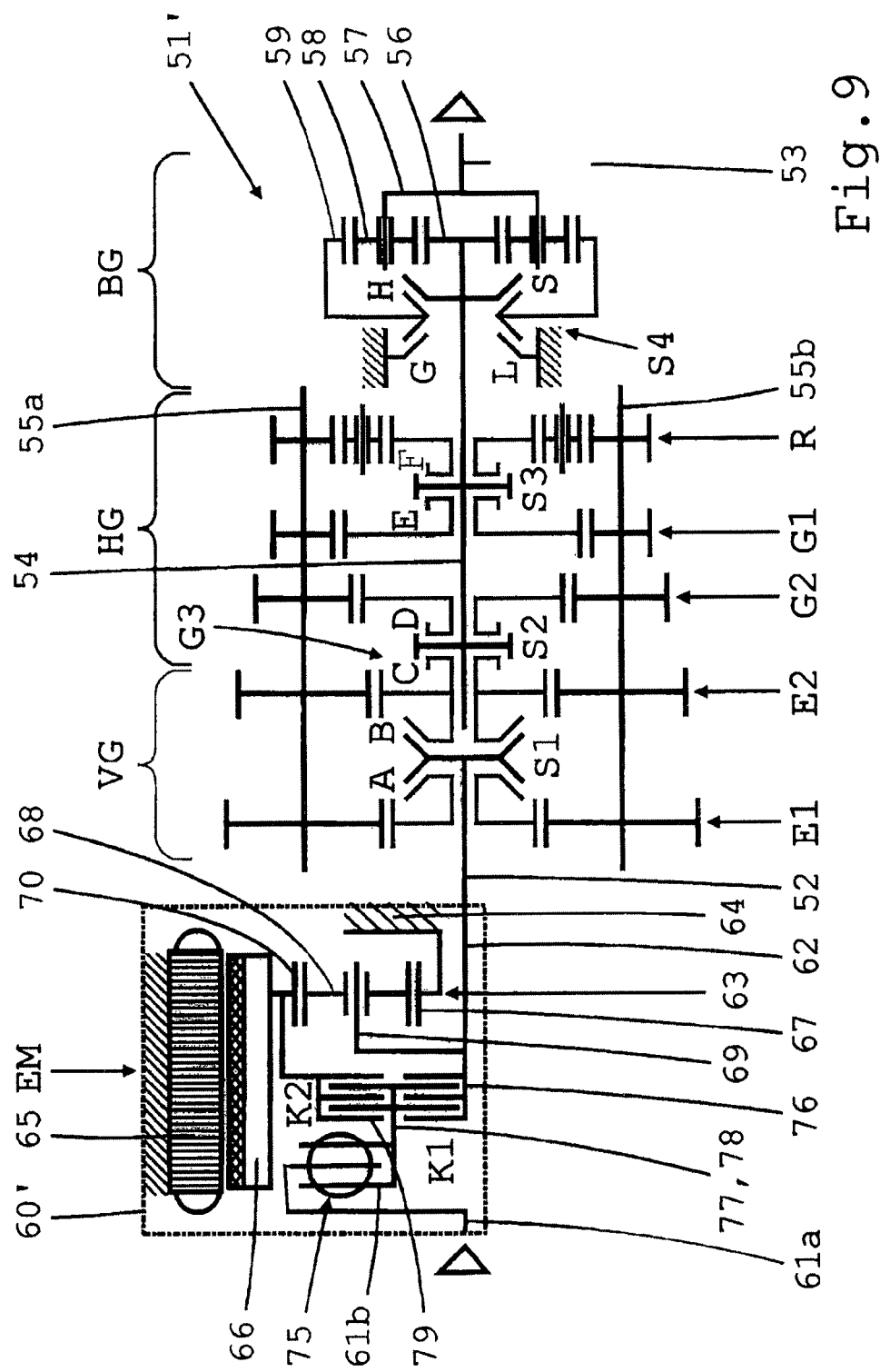
FIG. 9: A fourth embodiment of the hybrid drive train according to the invention, with a manual gearshift transmission, represented schematically.

A further embodiment of the hybrid drive train according to the invention with a manual gearshift transmission 51' according to FIG. 9 differs from the first embodiment variant shown in FIG. 8 only in having a differently configured input element 61 of the hybrid module 60' as well as another arrangement of the two separator clutches K1, K2. In this case the input element 61 of the hybrid module 60' consists of two rotary components 61a, 61b adjacent to one another, connected to one another by a rotary vibration damper 75.

Now, the two separator clutches K1, K2 are arranged coaxially with the first separator clutch K1 radially on the inside and the second separator clutch K2 radially on the outside, and the outer disk carrier 77 of the first separator clutch K1 and the inner disk carrier 78 of the second separator clutch K2 are connected to one another and to the second component 61b of the input element 61 of the hybrid module 60'. The inner disk carrier 76 of the first separator clutch K1 is this time connected in a rotationally fixed manner directly to the output element 62 of the hybrid module 60', and the outer disk carrier 79 of the second separator clutch K2 is connected in a rotationally fixed manner to the ring gear 70 that forms the input element of the input transmission stage 63.

The associated shift scheme of the hybrid drive train according to the invention shown in FIG. 8 and FIG. 9 and the overall gear ratios i concerned are summarized in the table constituting FIG. 10, which is based on a gear ratio of the input transmission stage 63 of $i_{EK}$=1.8. With the second separator clutch K2 engaged, the higher gear ratios i of the slow-driving range (G1L to G12L, R1L, R2L) are obtainable both for the internal combustion engine and for the electric machine EM, since the force flow of both drive machines pass in each case via the input transmission stage 63.

When the first separator clutch K1 is engaged the gear ratios i of the fast-driving range (G1H to G12H, R1H, R2H), usual in themselves, are obtainable only for the internal combustion engine since the torque of the electric machine EM is again transmitted via the input transmission stage 63 to the input shaft 52 of the gearshift transmission 51'. It goes without saying that during purely electric driving operation both separator clutches K1 and K2 are disengaged, so the internal combustion engine can then be switched off or run in idling operation.

INDEXES

1 Planetary automatic transmission
2 First planetary gearset
3 Sun gear
4 Planetary carrier
5 Planetary gear
6 Ring gear
7 Second planetary gearset
8 Sun gear
9 Planetary carrier
10 Planetary gear
11 Ring gear
12 Third planetary gearset
13 Sun gear
14 Planetary carrier
15 Planetary gear
16 Ring gear
17 Input shaft
18 Output shaft
19 Housing
20 Torque converter
21 Bridging clutch
22 Pump impeller wheel
23 Guide wheel
24 Turbine wheel
25 Input shaft
26 Oscillation damper
27 Freewheel clutch
28 Housing component
29 Primary retarder
30 Hybrid module
30' Hybrid module
31' Input element
31a First input element component
31b Second input element component
32 Output element
33 Module housing
34 Stator
35 Rotor
36 Input transmission stage
37 Sun gear
38 Planetary gear
39 Planetary carrier 40 Ring gear
41 Inner disk carrier of K1
42 Outer disk carrier of K1
43 Inner disk carrier of K2
44 Outer disk carrier of K2
45 Rotation oscillation damper
46 Inner disk carrier of K1
47 Outer disk carrier of K1
48 Inner disk carrier of K2
49 Outer disk carrier of K2
50 Bearing disk
51 Manual gearshift transmission, group transmission
51' Manual gearshift transmission, group transmission
52 Input shaft
53 Output shaft
54 Main shaft
55a Countershaft
55b Countershaft
56 Sun gear
57 Planetary carrier
58 Planetary gear
59 Ring gear
60 Hybrid module
60' Hybrid module
61 Input element
61a First component of the input element
61b Second component of the input element
62 Output element
63 Input transmission stage
64 Component fixed on the housing, module housing
65 Stator
66 Rotor
67 Sun gear
68 Planetary gear
69 Planetary carrier
70 Ring gear
71 Inner disk carrier of K1
72 Outer disk carrier of K1
73 Inner disk carrier of K2
74 Outer disk carrier of K2
75 Rotation oscillation damper
76 Inner disk carrier of K1
77 Outer disk carrier of K1
78 Inner disk carrier of K2
79 Outer disk carrier of K2
A, B Shift clutch of the upstream group
B1 Shift element, shift brake
B2 Shift element, shift brake
B3 Shift element, shift brake
BG Range group
C1 Shift element, shift clutch
C2 Shift element, shift clutch
C, D, F Shift clutch of the main transmission
E1 Gear ratio of the upstream group
E2 Gear ratio of the upstream group
EM Electric machine
G1-G6 Forward gears, gear ratio steps of the main transmission
G1H-G12H Forward gears
G1L-G12L Forward gears
i Gear ratio of the gears, overall gear ratio
$i_{EK}$ Gear ratio of the input transmission stage
K1 First separator clutch
K2 Second separator clutch
L Slow-driving stage of the range group
R Reverse gear, gear ratio step of the main transmission
RH Reverse gear
RL Reverse gear
R1H, R2H Reverse gear
R1L, R2L Reverse gear
S Fast-driving stage of the range group
S1-S4 Shift packet of the group transmission
VG Upstream group, splitter group

The invention claimed is:

1. A hybrid drive train for a motor vehicle, the drive train comprising:
an internal combustion engine with a driveshaft;
an electric machine (EM) being operable as both a motor and as a generator, and the electric machine (EM) comprising a stator (34; 65) and a rotor (35; 66);
a transmission (1; 51, 51') having an input shaft (17; 52) and an output shaft (18; 53);
the driveshaft of the internal combustion engine being connectable by at least a controllable first separator clutch (K1) to the input shaft (17; 52) of the transmission (1; 51, 51');
the electric machine (EM) being arranged coaxially around the input shaft (17; 52) of the transmission (1; 51, 51');
the rotor (35; 66) of the electric machine (EM) being in driving connection with the input shaft (17; 52) of the transmission (1; 51, 51') via an input transmission stage (36; 63) which is formed as a simple planetary gearset with a sun gear (37; 67), the simple planetary gearset forming a gear ratio ($i_{EK}$>1), between the rotor (35; 66) of the electric machine (EM) and the input shaft (17; 52) which is greater than one, so as to minimize a rotational speed of the electric machine (EM) when driving the hybrid drive train via the electric machine (EM), a plurality of planetary gears (38; 68) mounted for rotation on and distributed around a circumference of a planetary carrier (39; 69) and meshing with the sun gear (37; 67), and a ring gear (40; 70) meshing with the planetary gears (38; 68) such that the sun gear (37; 67) being fixed relative to a component (33; 64) attached to a housing, the ring gear (40; 70) being connected in a rotationally fixed manner to the rotor (35; 66) of the electric machine (EM), and the planetary carrier (39; 69) being connected in a rotationally fixed manner to the input shaft (17; 52) of the transmission (1; 51, 51').

2. The hybrid drive train according to claim 1, wherein the transmission is one of a multi-stage planetary transmission (1) and a multi-stage manual gearshift transmission (51, 51').

3. The hybrid drive train according to claim 1, wherein the electric machine (EM) is an internal-rotor machine with a rotor (35; 66) radially located inside the stator (34; 65), and the first separator clutch (K1 or K2) is arranged on an engine side and the input transmission stage (36; 63) is at least radially arranged inside the rotor (35; 66) on the transmission side.

4. The hybrid drive train according to claim 1, wherein the planetary carrier (39; 69) of the input transmission stage (36; 63) is connected in a rotationally fixed manner to a sun gear (3) of a planetary gear set (2) of the transmission (1; 51, 51').

5. The hybrid drive train according to claim 1, wherein the planetary carrier (39; 69) of the input transmission stage (36; 63) is connected in a rotationally fixed manner to a shift packet (S1) of an upstream group (VG) of the transmission (1; 51, 51').

6. The hybrid drive train according to claim 1, wherein engine torque is transmittable to the an electric machine (EM) only through the ring gear (70) of the input transmission stage (36; 63).

7. The hybrid drive train according to claim 1, wherein the driveshaft of the internal combustion engine is connectable to the ring gear (40; 70) of the input transmission stage (36; 63) via a controllable second separator clutch (K2).

8. The hybrid drive train according to claim 7, wherein the electric machine (EM), the first and the second separator clutches (K1, K2) and the input transmission stage (36; 63) are all arranged coaxially with one another and, along with the driveshaft of the internal combustion engine and the input shaft (17; 52) of the transmission (1; 51, 51'), are all combined with one another in a pre-assembled hybrid module (30, 30'; 60, 60') having an input element (31; 61), an output element (32; 62) and a module housing (33; 64), the input element (31; 61) of the hybrid module (30, 30'; 60, 60') is connected, in a rotationally fixed manner, to the driveshaft of the internal combustion engine, and the output element (32; 62), of the hybrid module (30, 30'; 60, 60'), is connected, in a rotationally fixed manner, to the input shaft (17; 52) of the transmission (1; 51, 51'), and the hybrid module (30, 30'; 60, 60') in combination with either a multi-stage planetary automatic transmission (1), conforms to dimensions of a hydrodynamic torque converter (20), or a multi-stage manual gearshift transmission (51, 51') conforms to dimensions of a converter shifting clutch that is instead usable.

9. The hybrid drive train according to claim 8, wherein the input element (31; 61) of the hybrid module (30, 30'; 60') comprises two components (31a, 31b; 61a, 61b) that are relatively rotatable, to a limited extent, with respect to one another and are connected to one another by a rotation oscillation damper (45; 75).

10. The hybrid drive train according to claim 1, wherein the rotor (35; 66) of the electric machine (EM) has a two-point mounting which comprises a fixed mounting and a loose mounting.

11. The hybrid drive train according to claim 10, wherein the fixed mounting of the rotor (35; 66) is a roller bearing arranged on an engine side, between a component fixed to the rotor and a component connected to the component (33; 64), and the loose mounting of the rotor (35; 66) is formed by gearteeth and mountings of the sun gear (37; 67), the planetary gears (38; 68), the planetary carrier (39; 69) and the ring gear (40; 70) of the input transmission stage (36; 63).

12. The hybrid drive train according to claim 1, wherein at least one of the first and the second separator clutches (K1, K2) is a disk clutch with an inner disk carrier (41, 43; 46, 48; 71, 73; 76, 78) and an outer disk carrier (42, 44; 47, 49; 72, 74; 77, 79).

13. The hybrid drive train according to claim 12, wherein the first and the second separator clutches (K1, K2) are arranged axially adjacent one another such that inner disk carriers (41, 43; 71, 73) of the first and the second separator clutches (K1, K2) are connected to one another and to the input element (31; 61) of the hybrid module (30'; 60), and an outer disk carrier (42; 72) of the first separator clutch (K1) is connected to the output element (39, 32; 62) of either the input transmission stage (36; 63) or the hybrid module (30'; 60), and an outer disk carrier (44; 74) of the second separator clutch (K2) is connected to the ring gear (40; 70) of the input transmission stage (36; 63).

14. The hybrid drive train according to claim 13, wherein the first and the second separator clutches (K1, K2) are arranged coaxially with one another with the first separator clutch (K1) arranged radially on an inside and the second separator clutch (K2) arranged radially on an outside such that an outer disk carrier (47; 77) of the first separator clutch (K1) and an inner disk carrier (48; 78) of the second separator clutch (K2) are connected to one another and also to the input element (31; 61a, 61b) of the hybrid module (30'; 60'), and the inner disk carrier (46; 76) of the first separator clutch (K1) is connected to the output element (32, 39; 62, 69) of either the input transmission stage (36; 63) or the hybrid module (30'; 60'), and the outer disk carrier (49; 79) of the second separator clutch (K2) is connected to the ring gear (40; 70) of the input transmission stage (36; 63).

15. A hybrid drive train of a motor vehicle, the drive train comprising:

an internal combustion engine having a driveshaft;

an electric machine (EM) comprising a stator (34; 65) and a rotor (35; 66), and the electric machine (EM) being operable both as a motor and as a generator;

a transmission (1; 51, 51') comprising an input shaft (17; 52) and an output shaft (18; 53), the driveshaft of the internal combustion engine being connectable, via a controllable first separator clutch (K1), to the input shaft (17; 52) of the transmission (1; 51, 51'), the electric machine (EM) being coaxially arranged around the input shaft (17; 52) of the transmission (1; 51, 51'), and the rotor (35; 66) of the electric machine (EM) being rotationally fixed to the input shaft (17; 52) of the transmission (1; 51, 51');

the rotor (35; 66) of the electric machine (EM) being connectable with the input shaft (17; 52) of the transmission (1; 51, 51') via an input transmission stage (36; 63) that has a gear ratio ($i_{EK}>1$) which is greater than one so as to minimize a rotational speed of the electric machine (EM) when driving the hybrid drive train via the electric machine (EM), the input transmission stage (36; 63) is a simple planetary gearset comprising a sun gear (37; 67), a plurality of planetary gears (38; 68) that are rotatably supported by a planetary carrier (39; 69) and meshing with the sun gear (37; 67), and a ring gear (40; 70) meshing with the planetary gears (38; 68), the sun gear (37; 67) being rotationally fixed to a housing component (33; 64), the ring gear (40; 70) being rotationally fixed to the rotor (35; 66) of the electric machine (EM), and the planetary carrier (39; 69) being rotationally fixed to the input shaft (17; 52) of the transmission (1; 51, 51').

16. A hybrid drive train for a motor vehicle, the drive train comprising:

an internal combustion engine with a driveshaft;

an electric machine (EM) being operable as both a motor and as a generator, and the electric machine (EM) comprising a stator (34; 65) and a rotor (35; 66);

a transmission (1; 51, 51') having an input shaft (17; 52) and an output shaft (18; 53);

the driveshaft of the internal combustion engine being connectable by at least a controllable first separator clutch (K1) to the input shaft (17; 52) of the transmission (1; 51, 51');

the electric machine (EM) being arranged coaxially around the input shaft (17; 52) of the transmission (1; 51, 51');

the rotor (35; 66) of the electric machine (EM) being in driving connection with the input shaft (17; 52) of the transmission (1; 51, 51') via an input transmission stage (36; 63) which is formed as a simple planetary gearset with a sun gear (37; 67), the simple planetary gearset forming a gear ratio ($i_{EK}>1$), between the rotor (35; 66) of the electric machine (EM) and the input shaft (17; 52) which is 1.8, so as to minimize a rotational speed of the electric machine (EM) when driving the hybrid drive train via the electric machine (EM), a plurality of planetary gears (38; 68) mounted for rotation on and distributed around a circumference of a planetary carrier (39; 69) and meshing with the sun gear (37; 67), and a ring gear (40; 70) meshing with the planetary gears (38; 68) such that the sun gear (37; 67) being fixed relative to a component (33; 64) attached to a housing, the ring gear (40; 70) being connected in a rotationally fixed manner to the rotor (35; 66) of the electric machine (EM), and the planetary carrier (39; 69) being connected in a rotationally fixed manner to the input shaft (17; 52) of the transmission (1; 51, 51').

* * * * *